United States Patent Office 3,239,444
Patented Mar. 8, 1966

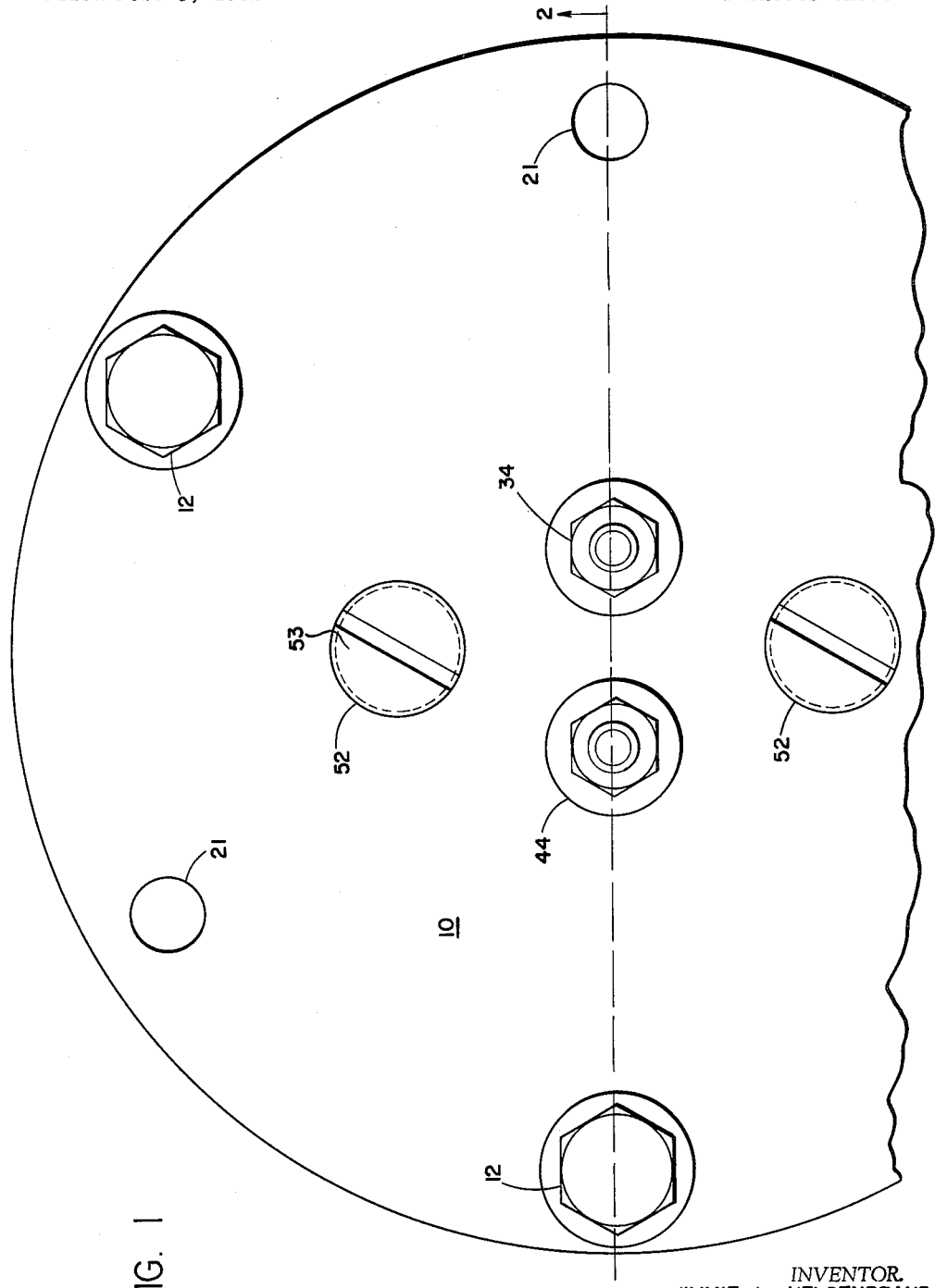

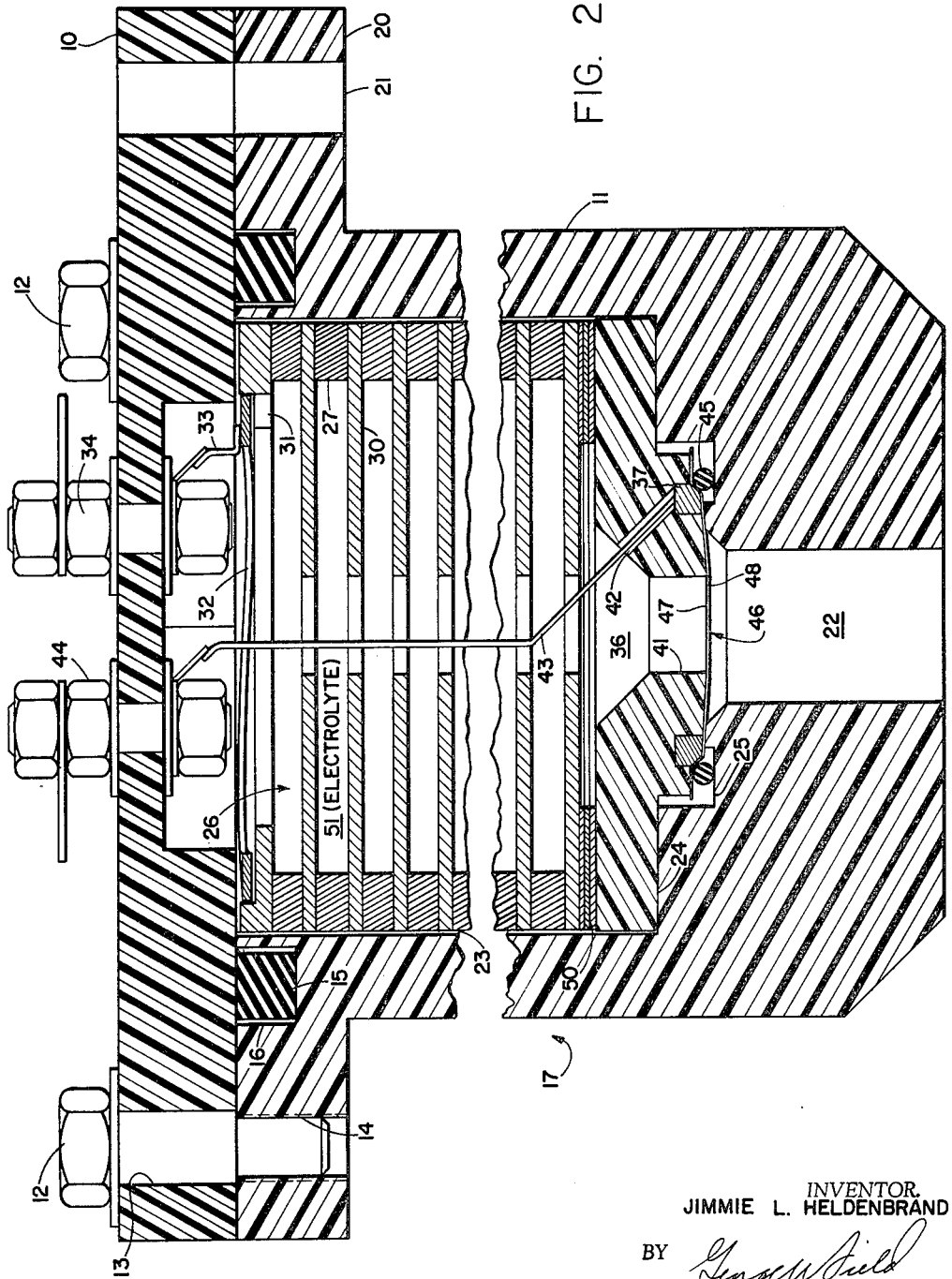

3,239,444
OXYGEN SENSING POLAROGRAPHIC CELL
Jimmie L. Heldenbrand, Columbia Heights, Minn., assignor to Honeywell Inc., a corporation of Delaware
Filed Feb. 8, 1962, Ser. No. 171,977
6 Claims. (Cl. 204—195)

This invention relates to the field of electrical instruments, and particularly to a polarographic cell of the self powered sort. When such cells are taken from the laboratory and applied in industry, aeronautics and similar arts they are found to have certain weaknesses. It is the object of the present invention to provide an improved polarographic cell which is simple to assemble and maintain and in which the effects of pressure changes are minimized.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

In the drawing, FIGURE 1 is a top view of a polarographic cell according to the invention, and FIGURE 2 is a longitudinal section taken along the line 2—2 of FIGURE 1.

Reference numeral 10 identifies a base plate and reference numeral 11 identifies a cover, secured thereto by machine screws 12 which pass through holes 13 in the base plate and engage tapped holes 14 in the cover. A sealing ring 15 is contained in a groove 16 in cover 11 for compression to seal the joint between the two parts 10 and 11 against leakage. The base plate and cover coact to provide a housing identified by the reference numeral 17, having a rim 20 bored at 21 to pass fastening means for securing the housing to a suitable support, which may be the wall of a chamber. Cover 11 is preferably circular in cross section for mounting in a circular opening, and at its lower end, which is opposite to rim 20, it has a central aperture 22 which communicates with a chamber 23 having a first shoulder 24 and a reentrant shoulder 25.

Contained within housing 17 is a consumable anode 26 made up of plates 27 and 30 of cadmium. Plates 27 are thicker than plates 30 and have a larger central perforation. Plates 30 are thinner than plates 27 and have a smaller central perforation. Anode 26 also includes a further cadmium plate 31 shouldered to engage a spring washer 32 to which is fastened a wire conductor 33 making connection to a first terminal 34 in base plate 10.

Anode 26 is mounted on a cap member 36: members 27, 30, 31 and 36 are all of a diameter to fit within cover 11. Molded in or otherwise fastened to the bottom of cap member 36 is an annulus 37 of cathode material, such as gold, having an external frusto-conical surface. Cap member 36 has a central bore 41 of smaller diameter than the aperture 22 in cover 11, and a further passage 42 is provided for leading a wire conductor 43 from annulus 36 to a second terminal 44 in base plate 10.

A resilient O ring 45 is located in the space between cap member 36 and the re-entrant shoulder 25 in cover 11, of a size to bear against the conical surface of annulus 37 and seal in place a closure member 46. In one embodiment of the invention member 46 consists of a cathodic inner layer 47, next to annulus 37, of microapertured gold foil, and an outer layer 48, of a material such as polyethylene which is permeable to oxygen but substantially impermeable to water vapor and liquids. Shoulder 24 of cover 11 bears against the outer surface of cap member 36 and a sufficient number of spacers 50 of Mylar or other suitable material are provided between cap member 36 and the bottom plate of anode 26 so that when screws 12 are tightened spring member 32 is compressed to resiliently support anode 26, and ring 45 is also compressed, sealing the space between anode 26 and cover 11 and simultaneously forcing closure member 46 against annulus 37 to make electrical connection between the annulus and the microapertured gold foil. The surface of cap member 36 which engages closure member 46 may preferably be slightly conical rather than absolutely flat.

A suitable electrolyte 51 such as a solution of sodium chloride and water is now injected into housing 17 through a filler hole 52 in base member 10, which may be closed by a suitable plug 53, and the cell is ready for self-powered use. It will be appreciated that the particular metals, cadmium and gold, and the particular electrolyte, sodium chloride solution, are given only as preferred and not as essential, and that other metals and electrolytes may also be used, the choice being influenced to some extent by whether the cell is to be self-powered or is to be externally powered. The electrolyte is preferably buffered.

The preferred self-powered embodiment is believed to operate as follows. When terminals 34 and 44 are electrically joined by an external load, preferably on the order of 1000 ohms, the cadmium begins to dissociate giving free electrons at the anode, according to the following expression $$2Cd^0 \rightarrow 2Cd^{++} + 4\epsilon^-$$

The electrons pass through the external load and move from the cathode into the electrolyte, which also includes dissolved oxygen molecules transmitted through the semipermeable membrane 46 and through the microapertured gold foil 47. The reaction at the cathode may be expressed as follows $$4\epsilon^- + O_2 + 2H_2O \rightarrow 4OH^-$$

The cadmium and hydroxyl ions combine at the anode according to the expression $$2Cd^{++} + 4OH^- \rightarrow 2Cd(OH)_2$$

The cadmium hydroxide is only soluble to a slight extent, and appears on the anode as a deposit which increases the internal resistance of the cell over a period of time until it has to be removed. To accomplish this the cell is drained through the filling holes and cover 11 is taken off. When cap member 36 is removed the anode assembly may immediately be separated into a number of plane rings, which are easily cleaned mechanically and reassembled into a working cell by reversal of the disassembly process.

When this cell is in use, any increase in internal pressure tends to cause the flexible closure member to bulge outward. If the cathode were simply a plate of gold set in cap 36, the change in distance from it to the membrane would vary the distance the oxygen molecules must travel in the electrolyte before they can reach the cathode, and thus change the characteristics of the cell. By using a microapertured foil which may move with the membrane this difficulty is diminished.

An alternative embodiment contemplates depositing the microapertured cathode material directly on one surface of the membrane, by photographic or other suitable techniques. This has the advantage that the cathode inescapably moves with the membrane and the problem of distance variation disappears, but the resulting structure is perhaps somewhat more delicate mechanically.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In combination: a cover of inverted cup shape having a central aperture; a base plate; means sealingly fastening said base plate to said cover; a hollow first electrode of large surface area; means resiliently supporting said electrode on said base plate within said cover; a cap member of insulating material supported on said electrode and having a central bore aligned with said aperture; an electrically conducting annulus having a conical electrode-engaging surface on said cap member surrounding said bore; a flexible closure member on said cap member including a finely apertured inner layer of material capable of acting as a second electrode and of very much smaller area than said first electrode, and an outer layer selectively permeable by oxygen but substantially impermeable by an electrolyte; a resilient sealing ring between said cover and said cap member pressing said closure member against said surface to close both said aperture and said bore, and to insure electrical connection between said inner layer and said annulus; an electrolyte in contact with said first and second electrodes; and means for making electrical connection to said electrodes.

2. A polarographic cell, comprising, in combination: a housing having an aperture therethrough; an electrolyte in said housing; a first electrode in said housing having an area exposed to said electrolyte which is large compared with the area of said aperture; and a flexible aperture closure insulatingly mounted on said first electrode, including an outer portion of material which is selectively permeable by oxygen but substantially impermeable by said electrolyte, and an inner portion of free engagement with said electrolyte, of material capable of acting as a second electrode in said electrolyte.

3. A self-powered polarographic cell comprising, in combination: a housing having an aperture therethrough; an electrolyte in said housing; a first electrode in said housing of material ionically consumable in said electrolyte, the surface area of said electrode being large compared with the area of said aperture; and a flexible member closing said aperture insulatingly mounted on said first electrode, including an outer portion, of material which is selectively permeable by oxygen but substantially impermeable by said electrolyte, and an inner portion in free engagement with said electrolyte of material capable of acting as a second electrode in said electrolyte.

4. In a polarographic cell, in combination: a hollow cylindrical electrode of relatively large internal surface comprising a stack of perforated plates of alternately small and large perforation areas; a hollow cap member of insulating material supported on said cylindrical electrode and having a bore surrounded by a conical electrode-engaging surface; a closure member including an apertured inner layer capable of acting as a second electrode and an outer layer selectively permeable by oxygen but substantially impermeable by liquids; an apertured housing containing said electrodes, said cap member, and said closure member in such a manner that said closure member closes said bore and the aperture in said housing and is pressed into engagement with said surface; means for making electrical connection with said electrodes; and an electrolyte in said housing in free contact with said electrodes.

5. In a polarographic cell, in combination: a housing of insulating material including a base plate and a cover sealingly secured thereto and having an aperture of limited area; a hollow cylindrical electrode of relatively large internal surface comprising a stack of perforated plates of alternately small and large perforation area; a hollow cap member of insulating material supported on said cylindrical electrode and having a bore surrounded by a conical electrode-engaging surface; a closure member on said cap member including a finely apertured inner layer of material capable of acting as a second electrode, and an outer layer selectively permeable by oxygen but substantially impermeable by an electrolyte; means resiliently supporting said first electrode, said cap member, and said closure member on said base plate within said housing, so that said closure member closes said bore and the aperture in said cover to prevent egress of electrolyte and water vapor therethrough while permitting ingress of oxygen.

6. In a polarographic cell, a stack consisting solely of perforated plates of a single electrode material, alternate plates in said stack being of larger and smaller perforation area, whereby to provide an electrode of large superficial area which may be readily disassembled into geometrically simple configurations to facilitate cleaning.

References Cited by the Examiner

UNITED STATES PATENTS

| | | | |
|---|---|---|---|
| 756,328 | 4/1904 | Christy | 204—110 |
| 1,251,302 | 12/1917 | Tainton | 204—110 |
| 1,433,017 | 10/1922 | McKee | 204—282 |
| 2,116,509 | 5/1938 | Cottrell | 204—283 |
| 2,371,123 | 3/1945 | Amundsen | 204—283 |
| 2,428,055 | 9/1947 | Von Hyzel | 204—282 |
| 2,807,577 | 9/1957 | Antonsen | 204—260 |
| 2,816,067 | 12/1957 | Keidel | 204—130 |
| 2,913,386 | 11/1959 | Clark | 204—195 |
| 2,939,827 | 6/1960 | Jacobson et al. | 204—195 |
| 3,000,805 | 9/1961 | Carritt et al. | 204—195 |
| 3,038,848 | 6/1962 | Brewer et al. | 204—195 |
| 3,070,539 | 12/1962 | Arthur et al. | 204—195 |
| 3,113,048 | 12/1963 | Thompson | 136—86 |
| 3,116,170 | 12/1963 | Williams et al. | 136—86 |

FOREIGN PATENTS 1,117,962   11/1961   Germany.

JOHN H. MACK, *Primary Examiner.*

JOHN R. SPECK, WINSTON A. DOUGLAS,
*Examiners.*

T. TUNG, *Assistant Examiner.*